United States Patent
Schramm et al.

(10) Patent No.: US 12,510,503 B2
(45) Date of Patent: Dec. 30, 2025

(54) SENSOR DEVICE AND METHOD FOR DETERMINATION OF PROPERTIES OF A LIQUID

(71) Applicant: Kyocera AVX Components (Werne) GmbH, Werne (DE)

(72) Inventors: Daniel Schramm, Lünen (DE); Marco Rutkowski, Selm (DE); Jan-Holger Grochowski, Kamen (DE)

(73) Assignee: Kyocera AVX Components (Werne) GmbH, Werne (DE)

( * ) Notice: Subject to any disclaimer, the term of this patent is extended or adjusted under 35 U.S.C. 154(b) by 217 days.

(21) Appl. No.: 18/569,074

(22) PCT Filed: Jun. 3, 2022

(86) PCT No.: PCT/EP2022/065268
§ 371 (c)(1),
(2) Date: Feb. 21, 2024

(87) PCT Pub. No.: WO2022/258543
PCT Pub. Date: Dec. 15, 2022

(65) Prior Publication Data
US 2024/0280528 A1    Aug. 22, 2024

(30) Foreign Application Priority Data

Jun. 11, 2021  (DE) .......................... 102021115222.4

(51) Int. Cl.
*G01N 27/22*  (2006.01)
*G01N 33/28*  (2006.01)

(52) U.S. Cl.
CPC ....... *G01N 27/226* (2013.01); *G01N 33/2847* (2013.01)

(58) Field of Classification Search
CPC combination set(s) only.
See application file for complete search history.

(56) References Cited

U.S. PATENT DOCUMENTS 5,423,214 A    6/1995  Lee
6,269,693 B1 *  8/2001  Irion ................. G01F 23/268
                                                73/304 C
(Continued)

FOREIGN PATENT DOCUMENTS

DE    1927694    11/1965
DE    3812687    10/1989

OTHER PUBLICATIONS

International Search Report and Written Opinion for Application No. PCT/EP2022/065268 with English Translation, mailed Sep. 13, 2022, 16 pages.

*Primary Examiner* — Alvaro E Fortich
(74) *Attorney, Agent, or Firm* — Dority & Manning, P.A.

(57) ABSTRACT

Aspects of the present disclosure relate to a sensor device and a method for determining properties of a liquid. In one example, a housing having an inner chamber for accommodating a liquid is provided. A circuit board structure is positioned within the inner chamber and has a plurality of rigid circuit board sections, each of which is connected by flexible conductor track carrier sections. The flexible conductor track carrier sections are each arranged between section edges of the rigid circuit board sections. Conductor surfaces are arranged on the rigid circuit board sections. The rigid circuit board sections are arranged parallel to each other and at a distance from each other, so that gaps are formed therebetween. At least one measuring capacitance is formed by the conductor surfaces facing each other across the gaps. The housing has slot receptacles, wherein section edges of the rigid circuit board sections are held in the slot receptacles.

13 Claims, 4 Drawing Sheets

(56) References Cited

U.S. PATENT DOCUMENTS

| | | | |
|---|---|---|---|
| 2013/0333925 A1* | 12/2013 | Sporon-Fiedler | H05K 1/0278 |
| | | | 29/830 |
| 2018/0093042 A1* | 4/2018 | Klemm | G01F 23/268 |
| 2020/0249191 A1* | 8/2020 | Schaefer, Jr. | G01N 27/223 |
| 2020/0319727 A1* | 10/2020 | Gipson | H03K 17/962 |

* cited by examiner

SENSOR DEVICE AND METHOD FOR DETERMINATION OF PROPERTIES OF A LIQUID

PRIORITY CLAIM

The present application is a 371 of International Application No. PCT/EP2022/065268, entitled "Measurement of Contaminations in Nonconducting Fluids," having a filing date of Jun. 3, 2022, which claims priority to German Application No. DE 102021115222.4, entitled "Measurement of Contaminations in Nonconducting Fluids," having a filing date of Jun. 11, 2021 and is hereby incorporated by reference in its entirety for all purposes.

FIELD

Example aspects of the present disclosure relate to a sensor device and a method for determining properties of a liquid. In particular, example aspects of the present disclosure relate to a device and a method for determining properties of a liquid according to a capacitive measuring principle.

BACKGROUND

U.S. Pat. No. 6,269,693 B1 describes a capacitive sensor for measuring a property of a fluid or a level of a fluid in a container. A circuit board is either flexible or has rigid and flexible sections. Metallic coatings form capacitor plates on the circuit board, which is then bent so that two capacitor plates are held at a distance from each other by spacers so that they form a capacitor. Additional metallic coatings are provided for shielding. Conductor tracks on the circuit board connect the capacitor plates to an evaluation circuit and the shield to a reference potential. The curved circuit board is held in a housing and fixed by fixing pins.

DETAILED DESCRIPTION

Figure 1:
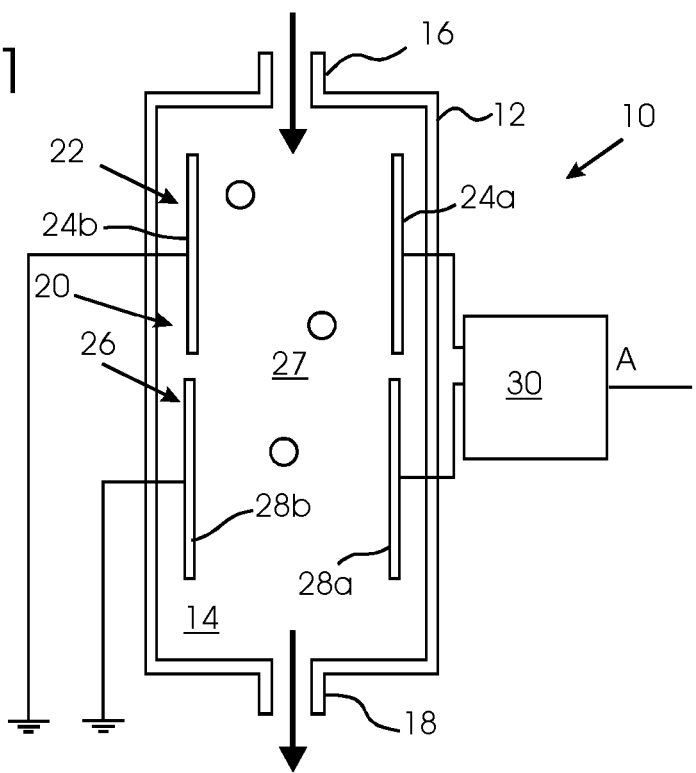
FIG. 1 depicts a schematic representation of a sensor device according to example embodiments of the present disclosure.

Aspects of the present disclosure are directed to a sensor device and a method for determining the properties of a liquid in which particularly accurate determining is possible.

The sensor device according to example aspects of the present disclosure has a housing with an inner chamber for accommodating a liquid, in which a circuit board structure with rigid circuit board sections is arranged, each of which is connected by flexible conductor track carrier sections.

The housing can be a container or tank, for example, and is, in some embodiments, a pipe section with an inlet and an outlet that are connected to each other via the inner chamber so that they can be flowed through.

The rigid circuit board sections and flexible conductor track carrier sections are each a flat, electrically non-conductive carrier material with electrically conductive conductor structures applied to it. Suitable plastic materials, in some embodiments, can serve as the carrier material. The rigid circuit board sections may be made of epoxy resin with glass fiber fabric such as FR4. The flexible conductor track carrier sections are flexible and can be made of polyimide, for example. Both the rigid circuit board sections and the flexible conductor track carrier sections serve as carriers for conductor structures such as conductor surfaces and conductor tracks made of conductive material (e.g. metal, copper).

The flexible conductor track carrier sections may be arranged in such a way that they connect section edges of the rigid circuit board sections, i.e. they bridge the area from a first edge of a first rigid circuit board section to a second edge of a second rigid circuit board section. To form the circuit board structure, the flexible conductor track carrier sections and the rigid circuit board sections may be arranged alternately as a chain.

The section edges of the rigid circuit board sections to which the flexible conductor track carrier sections are attached are, in some embodiments, at least essentially straight, although curved runs are also possible. In some embodiments, the rigid circuit board sections each have at least essentially the same shape and size. The shape of the circuit board sections may be at least substantially rectangular, which may include shapes in which one or more corners are rounded.

Conductor surfaces, i.e. surfaces made of conductive material, are arranged on at least some of the rigid circuit board sections (e.g., all of the rigid circuit board sections). In some embodiments, the conductor surfaces are large areas, such that, for example, more than half, such as more than three quarters of the area of the rigid circuit board sections is covered with conductor surfaces. The rigid circuit board sections are arranged parallel to each other and at a distance from each other, so that gaps are formed between them in which the liquid can be accommodated. The circuit board structure can be folded by bending the flexible conductor track carrier sections in order to achieve the parallel arrangement of the rigid circuit board sections. At least one measuring capacitance is formed via at least one gap (e.g., several gaps, all gaps) between opposite conductor surfaces. In some embodiments, several measuring capacitances are each formed via gaps between opposite conductor surfaces.

In some embodiments, the circuit board structure is fixed inside the housing such that the housing has slot receptacles and at least some (e.g., all) of the section edges of the rigid circuit board sections are held in the slot receptacles. At least some of the rigid circuit board sections (e.g., all rigid circuit board sections) are thus at least partially inserted into the slot receptacles on at least one side, such as on two opposite sides, and are thus fixed relative to the housing. The slot receptacles may be dimensioned such that the slot receptacles accommodate the rigid circuit board sections with a tight fit. In this way, the relative position of the rigid circuit board sections to each other can be fixed, even against the action of external forces (e.g., liquid flowing through the gaps).

The sensor device is suitable for electrical (e.g., capacitive) determination of properties of the liquid contained in or flowing through the inner chamber. For this purpose, a complex resistor can be determined, of which a capacitance value of at least one measuring capacitance can form at least one component. As the liquid in the gap between the conductor surfaces acts as a dielectric, the capacitance value depends on the dielectric properties of the liquid, which can vary depending on the composition and type of liquid. For example, a proportion of water in oil located in the gaps can be detected, as the permittivity of water is a multiple of the permittivity of oil.

By holding the section edges of the rigid circuit board sections in the slot receptacles, the arrangement of the rigid circuit board sections in relation to each other, i.e. the distance between the conductor surfaces, is kept constant. Measurement errors due to fluctuating capacitance values as a result of changes in the distance between the rigid circuit board sections are thus minimized, even when external forces are applied.

In the method according to example aspects of the present disclosure, a capacitance value of the measuring capacitance is determined using the elements explained above and, if necessary, further properties of a complex resistor comprising the measuring capacitance, from which a property of the liquid accommodated in the inner chamber and thus in the gaps can be derived. In this way, very simple and reliable detection is possible, especially of impurities (e.g., water content in oil, other components such as metal chips, etc).

According to example aspects of the present disclosure, a holding structure can be formed on the housing, which has a plurality of holding elements projecting in the direction of the inner chamber, between which the slot receptacles are formed. Such a holding structure can, for example, be attached to one or more housing walls which are arranged at an angle (e.g., a right angle) to the rigid circuit board sections. The holding elements of the holding structure can extend from the housing wall or, in some embodiments, opposite housing walls at the angle (e.g., a right angle). The holding elements can, for example, each be designed as plates. They can extend from one wall of the housing in a direction parallel to the rigid circuit board sections, such as from two opposite walls. In some embodiments, all holding elements of the holding structure are formed in one piece, for example from plastic. Further in some embodiments, the holding elements of the holding structure can be formed in one piece with at least one housing part, which allows a very precise and mechanically firm mounting of the circuit board structure with simple manufacture.

In some embodiments, mounting of the circuit board structure includes a one-sided mounting of the rigid circuit board sections. Alternatively, mounting of the circuit board may include slot receptacles on opposite section edges of the rigid circuit board sections. Two separate, opposing holding structures with protruding holding elements can be provided for this purpose.

In some embodiments, the housing can include at least a first and a second housing part. Further, a holding structure with slot receptacles may be provided on both the first and the second housing part.

In some embodiments, at least one fixing pin can be provided, which penetrates the rigid circuit board sections and thus fixes them. In some embodiments, several fixing pins are provided, which can be arranged parallel to each other at a distance. The use of one or more fixing pins is particularly advantageous in conjunction with protruding holding elements. A particularly good connection can then be achieved if the fixing pin penetrates both the holding elements and the rigid circuit board sections and thus fixes the latter in the slot receptacles.

The conductor surfaces can be arranged on one or both sides of the rigid circuit board sections. In some embodiments, on at least one of the rigid conductor sections, such as several rigid circuit board sections, a first conductor surface is arranged on a front side and as well on an opposite rear side a second conductor surface, such as of the same size and in a congruent arrangement. In some embodiments, the first and second conductor surfaces are kept at the same electrical potential by a direct electrical connection. This eliminates the influence of the material of the circuit board sections as a dielectric during the measurement.

According to example aspects of the present disclosure, two separate measuring capacitances can be formed via at least one of the gaps (e.g., several gaps, all gaps) These may be galvanically isolated from one another, i.e. comprise two separate pairs of conductor surfaces on the opposing rigid circuit board sections, which accordingly each cover only a part of their area. In some embodiments, two measuring capacitances formed across the same gap can be at least substantially equal, i.e. that the respective conductor surfaces are of equal size. In some embodiments, separate capacitance values of the two measuring capacitances can be determined by suitable means. This can be used to create redundancy in the determining process and thus make it possible to ensure the proper functioning of the sensor by balancing. In some embodiments, in which the inner chamber can be flowed through from an inlet to an outlet, the first and second measuring capacitances are arranged one behind the other at least at one gap (e.g., all gaps) in the direction of flow, so that impurities transported in the liquid flow pass both measuring capacitances one after the other. This ensures that both measuring capacitances each determine the full liquid flow.

According to example aspects of the present disclosure, the flexible conductor track carrier sections each have a plurality of conductor tracks running in parallel, which may be connected to the conductor surfaces on the rigid circuit board sections and connect them to each other and/or to a connection for an evaluation circuit. In order to be able to detect any damage to the flexible conductor track carrier sections, a circuit for detecting a line break can be provided, which is connected to at least one of the conductor tracks. A conductor track running along the outside edge of a flexible conductor track carrier section may be connected to the circuit for detection of a line break, as damage is naturally most likely to occur in the edge area. The conductor tracks running along the edge on both sides may be connected accordingly. The circuit for detecting the line break can, in some embodiments, comprise a conductor loop which includes conductor tracks on the flexible conductor track carrier sections and whose interruption can be detected by suitable means. The conductor loop can have as detection element an electrical component, such as a resistance element, whose electrical properties are detected by the circuit and which is arranged on one of the rigid circuit board sections or flexible conductor track carrier sections.

According to a further embodiment of the present disclosure, at least one (e.g., several, all) of the flexible conductor track carrier sections has a width which corresponds to less than 50% of the width of the rigid circuit board section to whose section edge it is attached. This leaves a sufficient length of the section edge that can be accommodated in the slot receptacles without the respective flexible conductor track carrier section having to be arranged there. In some embodiments, the width of the flexible conductor track carrier section is less than 25% of the width of the rigid circuit board section.

Separate measuring capacitances can be formed via a plurality of gaps between the rigid circuit board sections, which can, for example, be connected separately to a circuit for determining a capacitance value. In some embodiments, a plurality of measuring capacitances, which are formed across different gaps, are electrically connected in parallel. In some embodiments, measuring capacitances are connected in parallel across all gaps so that a combined measuring capacitance is formed. As such, this increases the capacitance value, which is favorable for the evaluation. For example, a relatively large part of the inner chamber can be determined simultaneously by determining the capacitance value of the combined measuring capacitance. The parallel connection of the measuring capacitances may be carried out via conductor tracks on the flexible conductor track carrier sections. The conductor surfaces on the rigid circuit board sections can be assigned alternately to the first or second electrode of the combined measuring capacitance. Such an arrangement may be used in combination with the fact that, as described above, conductor surfaces are arranged on both sides of the rigid circuit board sections and the front and rear conductor surfaces are each directly connected to each other.

FIG. 1 shows a schematic representation of a sensor device 10 according to a first embodiment. A housing 12 with an inner chamber 14 is provided for accommodating a liquid which flows in through an inlet 16, flows through the inner chamber 14 and is discharged through an outlet 18.

The liquid may be oil, for example, which may contain unknown amounts of water as a contaminant in the form of individual droplets. The sensor device 10 is used to determine any water content and to output an output signal A that indicates the presence of water content.

This is done according to a primarily capacitive measuring principle, wherein, however, as shown below, a measuring capacitance under consideration can also be part of a complex resistor and other components of the complex resistor can also be detected during measurement or determining.

A capacitor arrangement 20 is arranged in the inner chamber 14. The capacitor arrangement 20 comprises a first measuring capacitance 22, formed by two capacitor surfaces 24a, 24b facing each other across a gap 27, and a second measuring capacitance 26, formed by capacitor surfaces 28a, 28b, which are arranged at the same distance from each other across the gap 27.

The liquid (oil) arranged in the gap 27 thus forms the dielectric of the two measuring capacitances 22, 26. The capacitance value C1, C2 of the measuring capacitances 22, 26 depends on the properties of the liquid, in particular on the possible contamination, here for example by water droplets. The permittivity of oil is considerably lower than the permittivity of water, so that water droplets flowing through the gap 27 lead to an increase in the capacitance values C1, C2 of the measuring capacitances 22, 26. Likewise, other components in the liquid that have dielectric properties that differ from the pure liquid can lead to a detectable change.

The measuring capacitances 22, 26 are arranged one behind the other in the direction of flow from the inlet 16 to the outlet 18, so that the liquid and the impurities transported therein flow through them sequentially. In addition, the measuring capacitances 22, 26 are arranged in the flow path in such a way that at least substantially the entire liquid flow flows through the gap 27. This ensures that water components flowing through change the capacitance value of both measuring capacitances 22, 26 one after the other.

The measuring capacitances 22, 26 are connected to an evaluation device 30, which determines a capacitance value C1 for the first measuring capacitance 22 and a capacitance value C2 for the second measuring capacitance 26 at predetermined measuring intervals and, depending on the determined capacitance values C1, C2, outputs the output signal A, which indicates that a threshold value of the water content in the oil flowing through has been exceeded.

Figure 2:
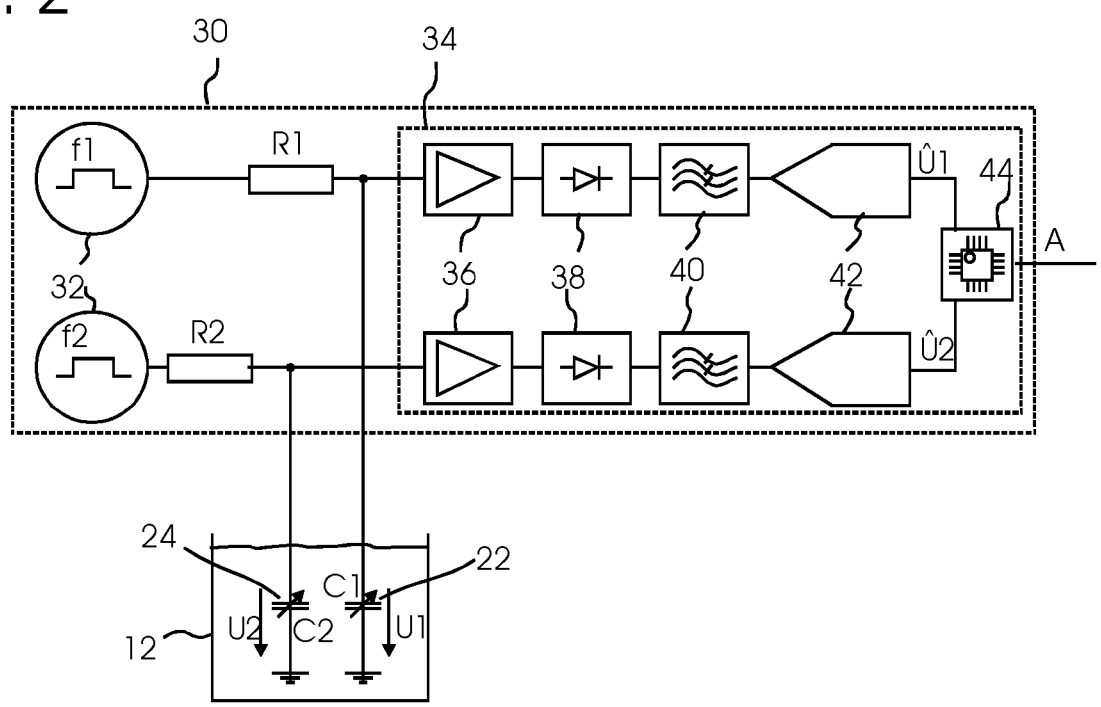
FIG. 2 depicts a schematic diagram of an evaluation circuit according to example embodiments of the present disclosure.

FIG. 2 shows in a schematic block diagram functional elements of the evaluation device 30, which are connected to the measuring capacitances 22, 24. The evaluation device has a two-channel structure, i.e. a separate channel is provided for each of the measuring capacitances 22, 24, comprising an excitation circuit 32, which is connected to a series circuit of a respective measuring resistor R1, R2 and the respective measuring capacitance 22, 24, and a channel of an evaluation circuit 34, which generates the output signal A.

Each measuring channel of the evaluation circuit 34 is connected to one of the measuring capacitances 22, 24 in order to determine their respective capacitance value C1, C2. For this purpose, it has a buffer amplifier 36, a peak value detector 38, a low pass 40 and an A/D converter 42 for each measurement channel. The two A/D converters 42 are connected to a processor 44 on which a program is executed that processes signals Û1, Û2 from the A/D converters 42 and generates the output signal A from them.

The first and second measuring capacitances 22, 24 are each connected to the respective measuring resistors R1, R2 as an RC element, so that a complex resistor is formed, which is excited by the associated excitation circuit 32 with a square-wave signal of a frequency f1, f2. The excitation frequencies f1, f2 of the two measuring channels differ. As a result, the respective capacitance C1, C2 is cyclically charged and discharged by the respective measuring resistor R1, R2. With a fixed time sequence, the voltage U2 resulting across the respective measuring capacitance 22, 24 is dependent on the capacitance value C1, C2.

The respective voltage signal U1, U2 is measured, digitized and processed in the evaluation circuit 34. First, it is buffered by the buffer amplifier 36. Its peak value is determined by the peak value detector 38 and, filtered by the low pass filter 40, evaluated by the AD converter 42 as a digital signal that is fed to the processor 44.

Figure 7:
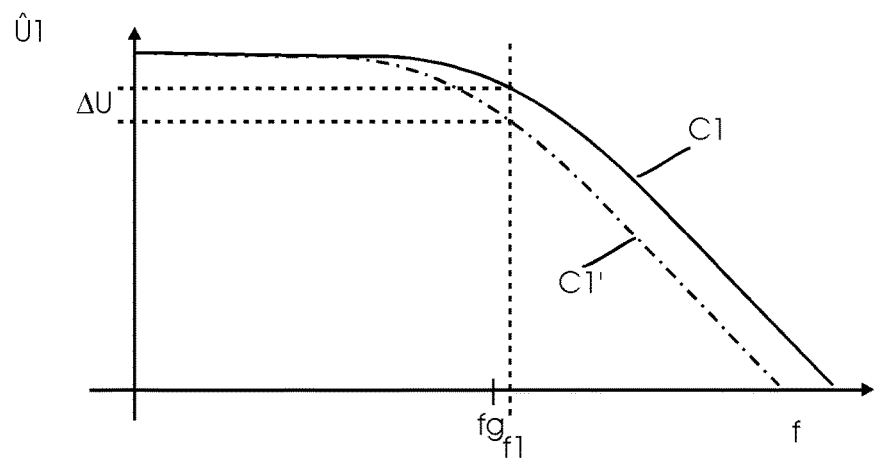
FIG. 7 depicts a diagram with a depiction of voltage signals as a function of an excitation frequency relative to an ideal low-pass filter according to example embodiments of the present disclosure.

The respective RC element acts as a low pass at both measurement channels. FIG. 7 shows for example for the first measuring capacitance 22 the curve of the output voltage U1 as a function of the frequency f—idealized and double logarithmic. As shown there, for a fixed capacitance value C1 (corresponding, for example, to the capacitance value of the first measuring capacitance 22, filled with liquid without impurities), excitation with different frequencies f results in the curve of the peak value of the output voltage Û1 shown with a solid line. Significantly below the cut-off frequency $f_G=1/(2\pi R1C1)$, there is essentially no attenuation and an essentially constant curve of the peak value of the output voltage Û1. In the range of the cut-off frequency $f_G$, the voltage value Û1 decreases with the attenuation curve towards higher frequencies f.

However, the cut-off frequency $f_G$ is dependent on the capacitance value C1 and therefore on the properties of the liquid, in particular the proportion of possible water impurities in the oil flow. A water content increases the capacitance C1 to a higher capacitance C1', so that the cut-off frequency $f_G$ decreases. In FIG. 7, the dotted line shows the curve of the peak value of the output voltage Û1 over various frequencies f for a low water content in the gap 27. As shown there, the curve is shifted to the left compared to the conditions without impurities.

Thus—at a fixed frequency f1—the change in capacitance C1 to capacitance C1' results in a difference in the output signal Û1. In order to achieve sufficient sensitivity of the sensor, the measuring frequency f1 is selected so that a clear difference ΔU can be seen when the capacitance changes. As is known, the level of the output signal at the cut-off frequency fg is approx. 70%. The measuring frequency f1 can be selected, for example, so that the level of the output signal (in each case considered at a fixed capacitance C1 without contamination) is between 90% and 10%.

If the measuring frequency or excitation frequency f1 of the first channel of the evaluation device 30 is selected appropriately, a variable output signal Û1 results depending on whether there is pure liquid (oil) without water or a certain proportion of water droplets in the gap 27. Other types of impurities, such as metal chips, also cause a change in the complex resistor, which can be recognized by a changed output signal.

The two separate measuring capacitances 22, 24 and the respective assigned channels of the evaluation circuit 30 thus supply signals Û1, Û2 to the processor 40 in digital form. The two signals Û1, Û2 are processed by an evaluation program executed by the processor 44 to generate the output signal A.

On the one hand, this includes a decision as to whether the respective signal Û1, Û2 shows a deviation that indicates a water content in the flowing oil. On the other hand, the processing can also include a plausibility check of the respective signal in order to detect possible error states.

In one embodiment, the evaluation program executed by the processor 44 performs a threshold value comparison for at least one of the signals Û1, Û2, wherein when the value falls below a previously defined threshold, a change is detected such that the output signal A indicates contamination of the oil by water. The respective threshold can, on the one hand, be predetermined according to previous calculations or, on the other hand, be determined by measurements and, if necessary, statistical evaluations.

For example, in new condition, in which it can be assumed that there is only pure oil in the gap 27, a frequency distribution of a large number of measurements can be determined and thus, for example, the statistical parameters of a standard distribution (mean value, standard deviation sigma) can be determined. The decision threshold can then be determined as a function of this, e.g. as the mean value minus n*sigma, wherein the factor n is to be selected appropriately so that, on the one hand, sufficient sensitivity is achieved but, on the other hand, sufficient robustness against false detections is ensured.

During operation of the sensor device 10, the two channels of the evaluation device 30 can be operated at the same or different frequencies f1, f2. In an embodiment with the same frequencies f1, f2, crosstalk may occur between the channels, so that at least slightly different frequencies may occur. In this case, both frequencies f1, f2 can be in the range of the cut-off frequency of the respective RC element (wherein the capacitance C without impurities is decisive). The signals Û1, Û2 from the two channels can each be used independently for a separate measurement and detection of significant impurities. The detection of the two channels can then be checked for plausibility so that, for example, the presence of an impurity is only signaled if impurities are detected in both channels at the same time.

In alternative embodiments, the frequencies f1, f2 can also deviate from each other to a greater extent. For example, the first channel connected to the first measuring capacitance 22 can be operated with a frequency f1 in the range of the cut-off frequency of the respective R1C1 element (wherein the capacitance C1 without impurities is also decisive here.) The second channel connected to the second measuring capacitance 24 is then operated, for example, with an excitation frequency f2 significantly below the excitation frequency f1 and also below the cut-off frequency, i.e. in ranges in which the curves shown in FIG. 7 show no or little change with frequency. In this case, the signal Û2 generated in the second channel can be used to normalize the signal Û1, e.g. by forming the difference or the ratio of the two signals.

It should also be noted that the capacitance values C1, C2 may be temperature-dependent. A temperature sensor (not shown) is therefore, in some embodiments, arranged in the inner chamber 14 of the housing 12, the measurement signal of which is also fed to the processor 44. The evaluation program may then take into account a previously calculated or experimentally determined compensation curve depending on the temperature signal.

While embodiments of the sensor device are described above, those with ordinary skill in the art will understand that various modifications and variations can be made to the embodiments without departing from the scope of the present disclosure. For example, a second embodiment of a sensor device is described below with reference to FIG. 3, FIG. 4a, FIG. 4b. The second embodiment provides for a special arrangement of capacitor surfaces of the measuring capacitances 22, 26 in the inner chamber 14 of the housing 12, as will be explained in detail below. In all other respects, however, the sensor device according to the second embodiment corresponds to the sensor device 10 described above according to the first embodiment, in particular with regard to the evaluation device 30. The differences between the embodiments are therefore explained below, wherein identical reference signs are used for identical or directly comparable elements.

Figure 4A:
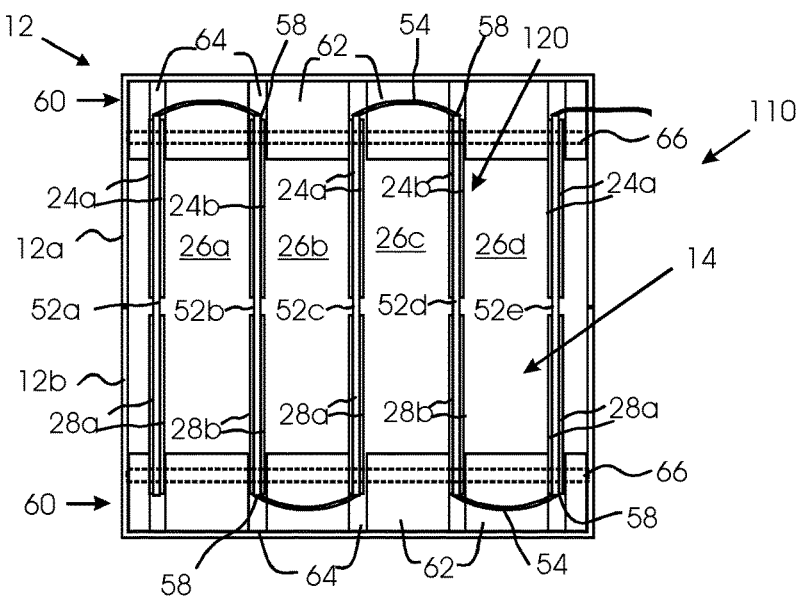
FIGS. 4a and 4b depict a longitudinal section and cross-section view of a sensor device with the circuit board structure of FIG. 3 in a folded form according to example embodiments of the present disclosure.
Figure 4B:
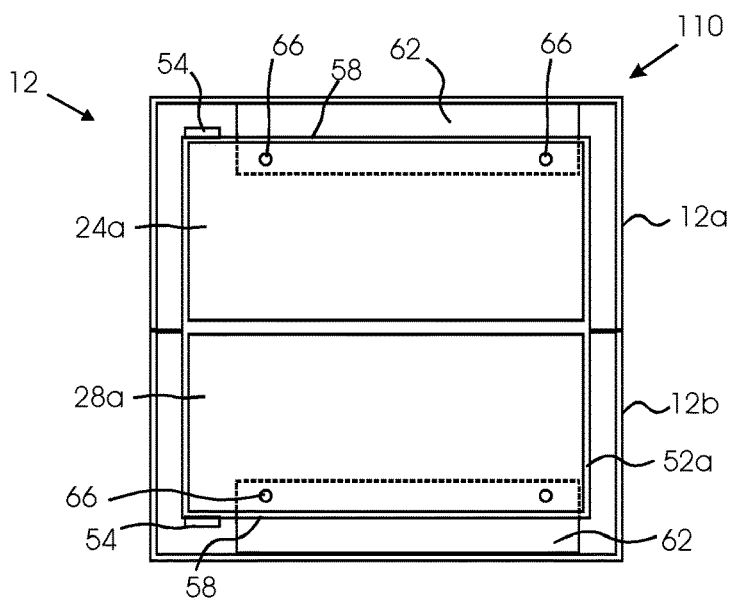

FIGS. 4a, 4b each show a transverse and longitudinal section of a part of a sensor device 110 according to the second embodiment. This comprises a two-part housing 12 with a housing top part 12a and housing bottom part 12b, between which the inner chamber 14 is formed. A capacitor arrangement 120 is arranged in the inner chamber 14. Each of the housing halves 12a, 12b has a holding structure 60 with holding elements 62 projecting in the direction of the inner chamber 14 and slot receptacles 64 formed therebetween. The holding elements 62 extend at right angles from opposite housing walls.

Figure 3:
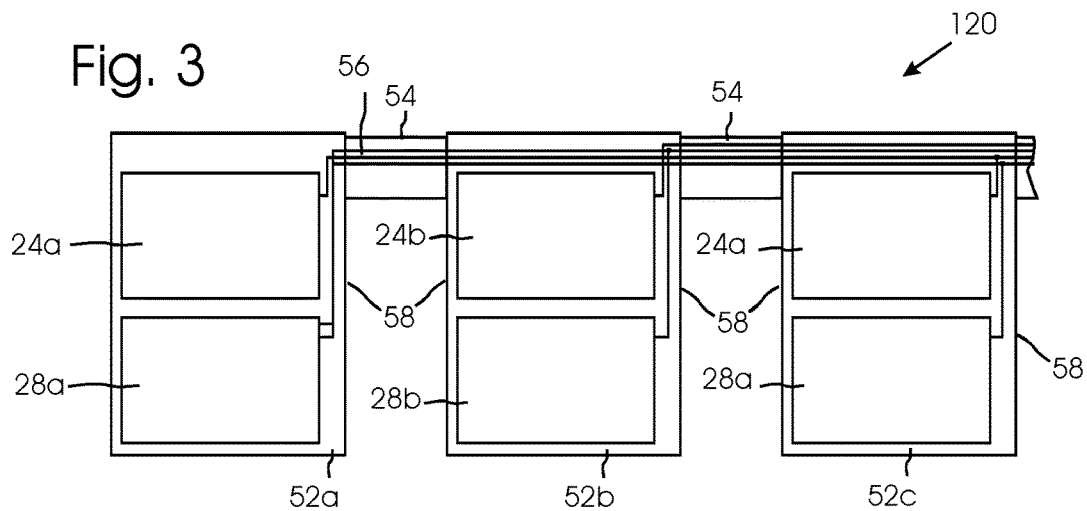
FIG. 3 depicts a side view of a part of a circuit board structure in an unfolded state according to example embodiments of the present disclosure.

A part of the capacitor arrangement 120 is shown in FIG. 3. It comprises a circuit board structure with several—in the example shown five—rigid circuit board sections 52a, 52b, which are each connected to flexible conductor track carrier sections 54 to form a chain. The rigid circuit board sections 52a, 52b may be, for example, conventional FR4 circuit boards, while the flexible conductor track carrier sections 54 may be, for example, polyimide strips.

The flexible conductor track carrier sections 54 each attach to edges 58 of the rigid circuit board sections 52a, 52b and are fixed there. In the embodiment shown, the flexible conductor track carrier sections 54 are not arranged in the center, but at the border of the respective edge 58. In this case, the flexible conductor track carrier sections 54 are of small width compared to the length of the edges 58, so that the predominant length of the edges 58 remains free and the corresponding areas of the rigid circuit board sections 52a, 52b can be used for fastening, as will be explained in more detail below.

Large conductor surfaces 24a, 24b, 28a, 28b are arranged on both sides of each of the rigid circuit board sections 52a, 52b. Two conductor surfaces 24a, 28a and 24b, 28b are arranged next to each other on the front and rear sides of each of the rigid circuit board sections 52a, 52b. The conductor surfaces 24a, 24b, 28a, 28b are formed in the same way and as copper layers as conductor tracks 56 on the flexible conductor track carrier sections 54 and conductor tracks on the rigid circuit board sections 52a, 52b. The conductor tracks electrically connect the conductor surfaces 24a, 24b, 28a, 28b as shown schematically in FIG. 5.

For arrangement in the inner chamber 14, the circuit board structure of the capacitor arrangement 120 is folded so that the rigid circuit board sections 52a, 52b are each arranged parallel to each other at a distance and the conductor surfaces 24a, 24b, 28a, 28b act as capacitor surfaces and form measuring capacitances via the gaps arranged therebetween.

The circuit board structure of the capacitor arrangement 120 is held in the folded arrangement within the housing 12 by the edges 58 of the rigid circuit board sections 52a, 52b each being inserted into the slot receptacles 64 of the holding structure 60, where they are accommodated in a close fit and fixed by holding pins penetrating both the holding elements 62 and the rigid circuit board sections 52a, 52b. However, as shown in FIG. 4b, only the free portions of the edges 58, i.e. those which are not occupied by the flexible conductor track carrier sections 54, are accommodated in the slot receptacles 64, so that the flexible conductor track carrier sections 54 are not pinched. The extension of the holding elements 62 is parallel to the orientation of the rigid circuit board sections 52a, 52b.

Figure 5:
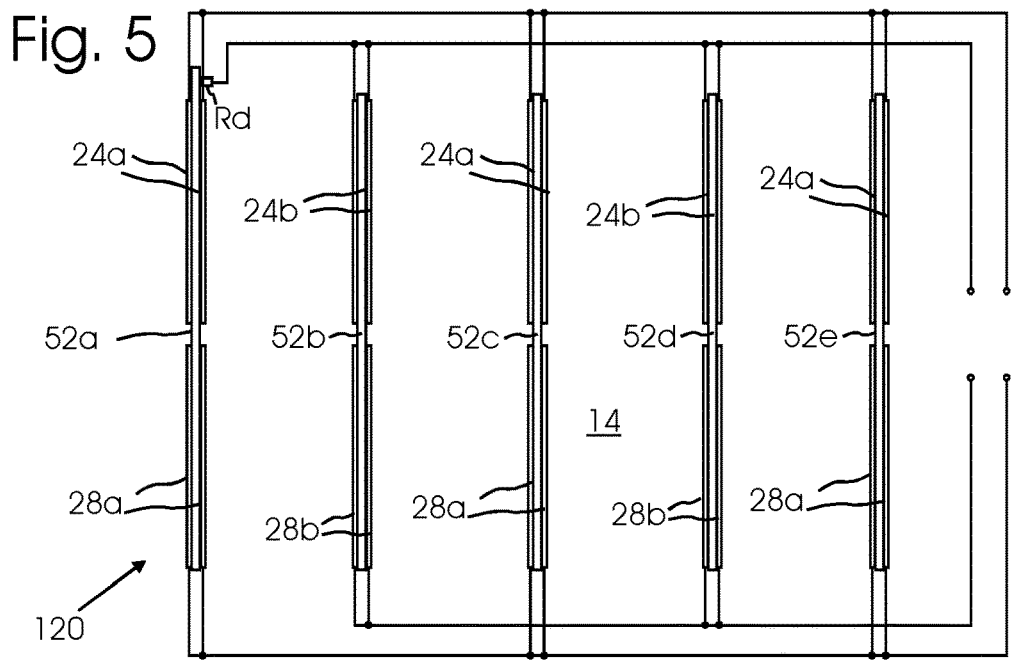
FIG. 5 depicts a schematic representation of a circuit diagram of the electrical configuration of the circuit board structure of the sensor device of FIGS. 4a and 4b according to example embodiments of the present disclosure.

As shown schematically in FIG. 5, the conductor surfaces 24a, 24b; 28a, 28b applied to both sides of the rigid circuit board sections 52a, 52b are electrically short-circuited, i.e. the conductor surfaces on the front and rear sides are always at the same electrical potential. As already explained, opposite conductor surfaces 24a, 24b; 28a, 28b form measuring capacitances via the gaps arranged between them, wherein the liquid contained in the inner chamber 14 forms the dielectric. The direct electrical connection of the conductor surfaces 24a, 24b; 28a, 28b on both sides ensures that the material of the rigid circuit board sections 52a, 52b does not form a dielectric of the measuring capacitances and thus has no influence on the measurement.

As shown further in FIG. 5, the individual measuring capacitances are connected in parallel so that two combined measuring capacitances are formed, each of which covers all gaps and thus the entire inner chamber 14. As shown in FIG. 1 for the basic embodiment, the two combined measuring capacitances are arranged one behind the other between the inlet and outlet (not shown).

Figure 6A:
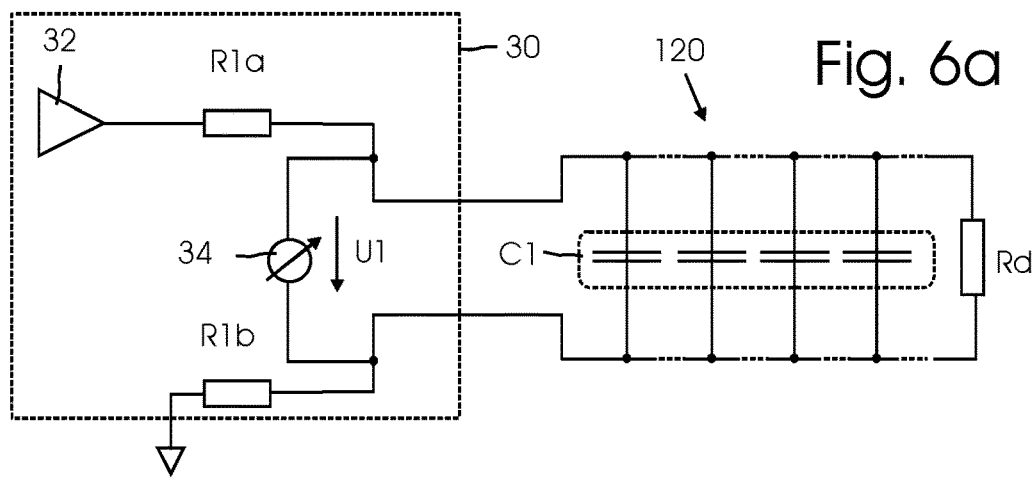
FIGS. 6a and 6b depict circuit diagrams of example embodiments for connecting the circuit board structure of FIGS. 3-5 to an evaluation device according to example embodiments of the present disclosure.

FIG. 6a shows a first variant of the connection of the capacitor arrangement 120 to the evaluation device 30. As already explained with regard to FIG. 2, the combined measuring capacitance C1 is connected in series with a resistance element to the excitation circuit 32. A complex resistor can be formed, for example, in various ways in that the resistor element Ria can be arranged in front of the measuring capacitance from the point of view of the excitation circuit 32, or alternatively behind it (resistor element Rib), or both of the resistor elements Ria, Rib shown can be provided.

Figure 6B:
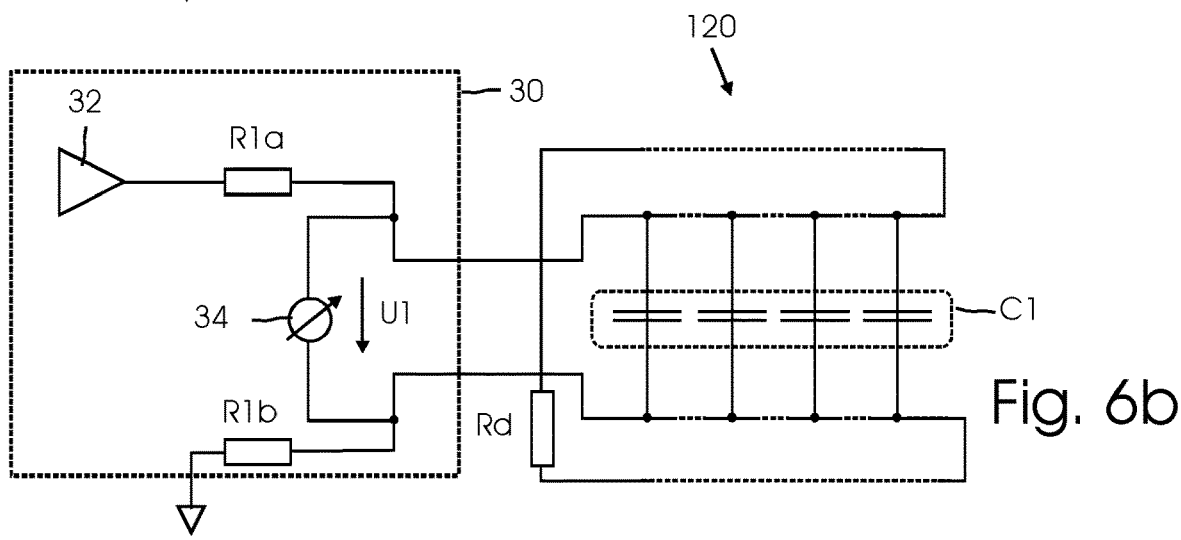

In addition, to detect line breaks, in particular in the area of the flexible conductor track carrier sections 54, by connecting a detection resistor Rd in parallel to the measuring capacitance C1 a conductor loop can be formed across all rigid circuit board sections 52a, 52b and across all flexible conductor track carrier sections 54. The detection resistor Rd can be arranged on the last rigid circuit board section 52a, 52b as shown in the first variant according to FIG. 6a or elsewhere, for example on the first rigid circuit board section 52a as shown in the second variant according to FIG. 6b. In any case, a conductor loop containing the detection resistor Rd is formed over all flexible conductor track carrier sections 54, wherein, in some embodiments, the conductor tracks of the conductor loop each run along the two edges of the flexible conductor track carrier sections 54, so that these are monitored in a special way.

The parallel connection of the detection resistor Rd to the combined measuring capacitance C1, in combination with the series connection with the resistor elements Ria and/or Rib, again forms a complex resistor. The evaluation is still carried out as explained above, wherein, however, in the event that the line loop with the detection resistor Rd is no longer closed due to a line break, this is detected by the evaluation device 30.

Figure 8:
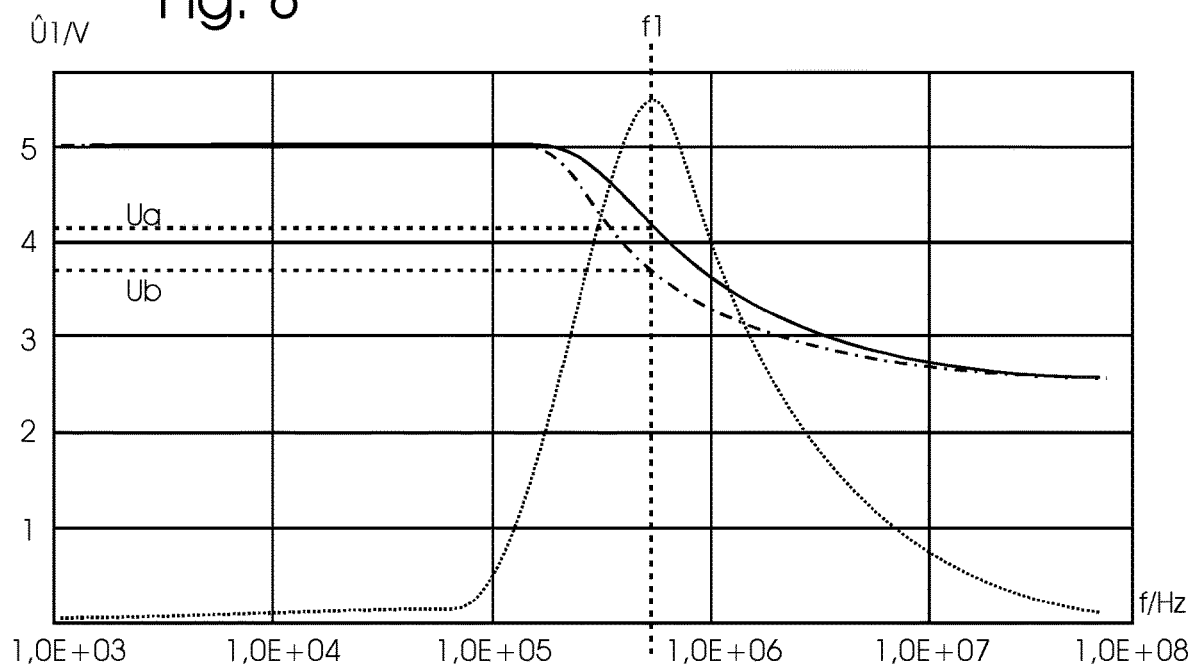
FIG. 8 depicts a diagram with a depiction of voltage signals as a function of an excitation frequency relative to the circuit depicted in FIGS. 5, 6a, and 6b according to example embodiments of the present disclosure.

For the complex resistor formed by Ria/R1b, the capacitance C1 and the detection resistor Rd, FIG. 8 shows an example of the curve of the output voltage U1 as a function of the frequency f. For a capacitance value C1 (without impurities), the frequency response shown with a solid line results with a cut-off frequency approximately at $f_G=1/(2\pi R1C1)$, while with water components in the gap 27, the frequency response shown with a dotted line results with a lower cut-off frequency, i.e. as a curve shifted to the left compared to the conditions without impurities.

The dotted line shows the frequency-dependent difference in the output signals between the liquid without impurities (solid line) and the liquid with water droplets (dash-dotted line). The difference curve forms a maximum in the range just above the cut-off frequency $f_G$ for the case without impurities.

This frequency, at which the voltage difference resulting from the change in capacitance is at a maximum, is used in some embodiments as the excitation frequency f, of the first channel of the evaluation device 30. As shown by way of example in FIG. 8, this measurement frequency f, results in an output voltage Ua in the case of liquid without water content, while the output voltage Ub results with a certain proportion of water droplets.

While the frequency response in the range of the cut-off frequency is variable as shown, the signal curves are very flat well above and below the cut-off frequency. The voltage values U1 at low frequencies (approx. 5 V in the example in FIG. 8) and at high frequencies (approx. 2.7 V in the example in FIG. 8) are determined by the detection resistor Rd, among other things. Voltage values significantly outside the voltage range thus delimited (2.7-5V in the example)

thus indicate a fault condition, i.e. a short circuit or line break, for example. This can be easily recognized by an evaluation program executed by the processor 44.

It should be noted that the present disclosure is not limited to the embodiments and variants described, but that further embodiments are possible. For example, instead of two measuring capacitances 22, 26, only a single measuring capacitance or further measuring capacitances may be provided. For example, a different number of rigid circuit board sections 52a, 52b may also be provided. Instead of signal evaluation with peak value detection, the respective instantaneous value can also be evaluated by using fast A/D converters. In general, the features of the embodiments and the claims can be combined as desired.

The invention claimed is:

1. A sensor device, comprising:
a housing comprising an inner chamber, the inner chamber configured to accommodate a liquid; and
a circuit board structure positioned within the inner chamber, the circuit board structure comprising a plurality of rigid circuit board sections, each rigid circuit board section of the plurality of rigid circuit board sections connected by flexible conductor track carrier sections;
wherein the flexible conductor track carrier sections are arranged between section edges of the rigid circuit board sections,
wherein conductor surfaces are arranged on the rigid circuit board sections,
wherein the rigid circuit board sections are arranged parallel to and spaced apart from each other so that gaps are formed therebetween,
wherein at least one measuring capacitance is formed by the conductor surfaces facing each other across the gaps, and
wherein the housing has slot receptacles, wherein the section edges of the rigid circuit board sections are held in the slot receptacles.

2. The sensor device of claim 1, wherein the housing further comprises:
a holding structure comprising holding elements projecting in a direction of the inner chamber,
wherein the slot receptacles are formed between the holding elements.

3. The sensor device of claim 2, wherein the holding elements extend from a wall of the housing at an angle.

4. The sensor device of claim 2, wherein the holding elements extend from a wall of the housing parallel to an orientation of the rigid circuit board sections.

5. The sensor device of claim 2, wherein at least one fixing pin is provided, the at least one fixing pin penetrating the holding elements and the rigid circuit board sections received between the holding elements.

6. The sensor device of claim 1, wherein the rigid circuit board sections are each held at two opposite section edges in the slot receptacles.

7. The sensor device of claim 1, wherein the housing comprises at least a first housing part and a second housing part.

8. The sensor device of claim 1, wherein
at least one of the rigid circuit board sections has a first conductor surface on a front side and a second conductor surface on an opposite rear side,
wherein the first and second conductor surfaces are at the same electrical potential due to direct electrical connection.

9. The sensor device of claim 1, wherein two separate measuring capacitances are formed via at least one of the gaps.

10. The sensor device of claim 1, wherein the housing has an inlet and an outlet,
wherein the inlet and the outlet are connected to one another via the gaps so that they can be flowed through.

11. The sensor device of claim 1, wherein the flexible conductor track carrier sections each have a plurality of parallel conductor tracks,
wherein at least one conductor track extending externally along an edge of a flexible conductor track carrier section is connected to a circuit for detection of a line break.

12. The sensor device of claim 1, wherein at least one of the flexible conductor track carrier sections, which is attached to a section edge of a rigid circuit board section, has a width which is less than 50% of the width of the rigid circuit board section.

13. The sensor device of claim 1, wherein a plurality of measuring capacitances is formed across the gaps, the measuring capacitances being connected to each other in such a way that they are electrically connected in parallel.

* * * * *